United States Patent
Roulland

(10) Patent No.: US 8,275,545 B2
(45) Date of Patent: *Sep. 25, 2012

(54) SYSTEM AND METHOD FOR LOCATING AN OPERATOR IN A REMOTE TROUBLESHOOTING CONTEXT

(75) Inventor: Frederic Roulland, Le Versoud (FR)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/371,636

(22) Filed: Feb. 13, 2012

(65) Prior Publication Data

US 2012/0144238 A1    Jun. 7, 2012

Related U.S. Application Data

(63) Continuation of application No. 12/273,779, filed on Nov. 19, 2008, now Pat. No. 8,155,878.

(51) Int. Cl.
*G05D 1/02* (2006.01)
*G06G 7/78* (2006.01)
*G01B 11/14* (2006.01)
*H04M 11/06* (2006.01)
*H04W 24/00* (2009.01)

(52) U.S. Cl. ............. 701/525; 455/404.2; 455/414.1; 455/456.1

(58) Field of Classification Search .......... 701/525; 455/404.2, 414.1, 456.1
See application file for complete search history.

(56) References Cited

U.S. PATENT DOCUMENTS

| | | |
|---|---|---|
| 6,535,838 B2 | 3/2003 | Abraham et al. |
| 6,697,894 B1 | 2/2004 | Mitchell et al. |
| 6,862,589 B2 | 3/2005 | Grant |
| 6,885,860 B2 | 4/2005 | Bahl et al. |
| 6,985,240 B2 | 1/2006 | Benke et al. |
| 7,197,503 B2 | 3/2007 | Palanisamy et al. |
| 7,460,011 B1 | 12/2008 | Liau et al. |
| 7,907,901 B1 | 3/2011 | Kahn et al. |
| 2003/0009710 A1 | 1/2003 | Grant |
| 2004/0103116 A1 | 5/2004 | Palanisamy et al. |
| 2005/0222933 A1 | 10/2005 | Wesby |
| 2006/0197973 A1 | 9/2006 | Castellani et al. |
| 2007/0055767 A1 | 3/2007 | Victor |
| 2007/0064594 A1 | 3/2007 | Norton |
| 2008/0183852 A1 | 7/2008 | Pramer et al. |
| 2010/0125759 A1 | 5/2010 | Roulland |

FOREIGN PATENT DOCUMENTS

| | | |
|---|---|---|
| EP | 1386199 B1 | 6/2006 |
| WO | 0063763 A1 | 10/2000 |
| WO | 02091088 A2 | 11/2002 |
| WO | 03098908 A1 | 11/2003 |
| WO | 2004046953 A1 | 6/2004 |

*Primary Examiner* — Lena Najarian
*Assistant Examiner* — Minnah Seoh
(74) *Attorney, Agent, or Firm* — Fay Sharpe LLP

(57) ABSTRACT

A system locates a user in a remote troubleshooting environment. An office device is utilized to perform at least one of a copy, a facsimile, a print, and an email. A headset facilities audio communication between the user and a remote troubleshooter. A compass is located proximate to the office device wherein the headset is placed in a predetermined location proximate to the compass to establish a datum point such that movement from the datum point is recognized as a location proximate to the office device. A remote processing component displays the location of the headset relative to the office device based on information provided by the compass.

21 Claims, 4 Drawing Sheets

SYSTEM AND METHOD FOR LOCATING AN OPERATOR IN A REMOTE TROUBLESHOOTING CONTEXT

CROSS REFERENCE TO RELATED PATENTS AND APPLICATIONS

This application claims the priority, as a continuation, of U.S. application Ser. No. 12/273,779, filed Nov. 19, 2008, entitled, "SYSTEM AND METHOD FOR LOCATING AN OPERATOR IN A REMOTE TROUBLESHOOTING CONTEXT", by Roulland, the disclosure of which is incorporated herein by reference in its entirety.

BACKGROUND

The present disclosure broadly relates to troubleshooting office equipment and, more particularly, to providing direction to a user based on their location relative to the office equipment. A communication device can facilitate between the user-remote troubleshooter communication as well as real time location of the user to the troubleshooter.

Users of office equipment such as multifunction printers (MFP) can encounter problems that require remediation. Oftentimes repair of office equipment can include the identification of a part or system causing a particular performance issue. Generally, one or more office personnel are called to remedy the performance issue by replacement of one or more components, removal of pages from a flow path, replacement of disposable components, etc. Due to the relative complexity of most conventional office equipment, such troubleshooting and remediation can require an inordinate amount of time to remedy. Meanwhile, the office equipment in question cannot be utilized by one or more office personnel. Such down time for equipment can cause deleterious effects in productivity within an office.

Repair information is generally presented to a user via a hard copy text in the form of a booklet or appears on or proximate to the office equipment. The user utilizes the written text to follow instructions contained therein to follow known troubleshooting paths for issue remediation. Written instructions, however, do not always provide an immediate solution to a particular problem. Worse, such instructions can provide an incorrect solution based on what a user may perceive a problem to be. In some cases the user believes that a problem is caused by an issue in one area of one location in the office equipment where in fact the root cause is from a disparate location. In such instances, futile efforts can be undertaken by the user to fix such a problem.

In one example, a user can phone a call center to engage in a troubleshooting session over the phone in order to try and solve a problem remotely to avoid the cost of sending a service engineer to a user location. Remote troubleshooting, however, has shown that remote troubleshooting activity can be made more complex because of the dislocation between the device and the troubleshooting resources. Previous disclosures have addressed this issue by proposing to support troubleshooting conversation directly from a device user interface, wherein communication of a history and status of the device is communicated to a remove troubleshooter via a shared virtual representation of the device.

However, this system does not specifically support the issue that has been observed when situating instructions for the user near the device. Part of the work of the remote troubleshooter is to understand the location of the user each time in order to be able to a) understand user observations in their proper context and b) provide instructions with location information that are contextualized to the user. This issue represents a non negligible part of the troubleshooting session and can lead to strong misunderstanding between the user and the troubleshooter if not handled appropriately.

What are needed are systems and methods to provide efficient direction to address performance related issues for office equipment.

BRIEF DESCRIPTION

In one aspect, a system locates a user in a remote troubleshooting environment. An office device is utilized to perform at least one of a copy, a facsimile, a print, and an email. A headset facilitates audio communication between the user and a remote troubleshooter. A compass is located proximate to the office device wherein the headset is placed in a predetermined location proximate to the compass to establish a datum point such that movement from the datum point is recognized as a location proximate to the office device. A remote processing component displays the location of the headset relative to the office device based on information provided by the compass.

In yet another aspect, a method is employed to establish communication between a user and a troubleshooter during a session. A communication device is placed at a predetermined point to establish datum. Location data is received from the communication device relative to the datum. High frequency changes in the location data are filtered out and the location data is transmitted to a remote processor. The location data is displayed in substantially real time to a remote troubleshooter.

In yet another aspect, a method is employed to provide contextualized direction to a user during a troubleshooting session. Communication is initiated from a user to a remote troubleshooter via multifunction device. User location is transmitted to a remote computer via the multifunction device. User location is displayed relative to the multifunction device in substantially real time to the remote troubleshooter via the remote computer. The user is directed based at least in part upon the user location relative to the multifunction device.

DETAILED DESCRIPTION

Users of devices such as multifunction printers (MFP) often encounter problems that can be easily remedied when provided with appropriate direction. In order to expedite solution of such problems, systems and methods are disclosed herein to facilitate remote troubleshooting. The aim of the exemplary embodiments is to automatically detect the location of the user relative to the device and to communicate this information to the remote troubleshooter in order to enhance the troubleshooting session.

Figure 1:
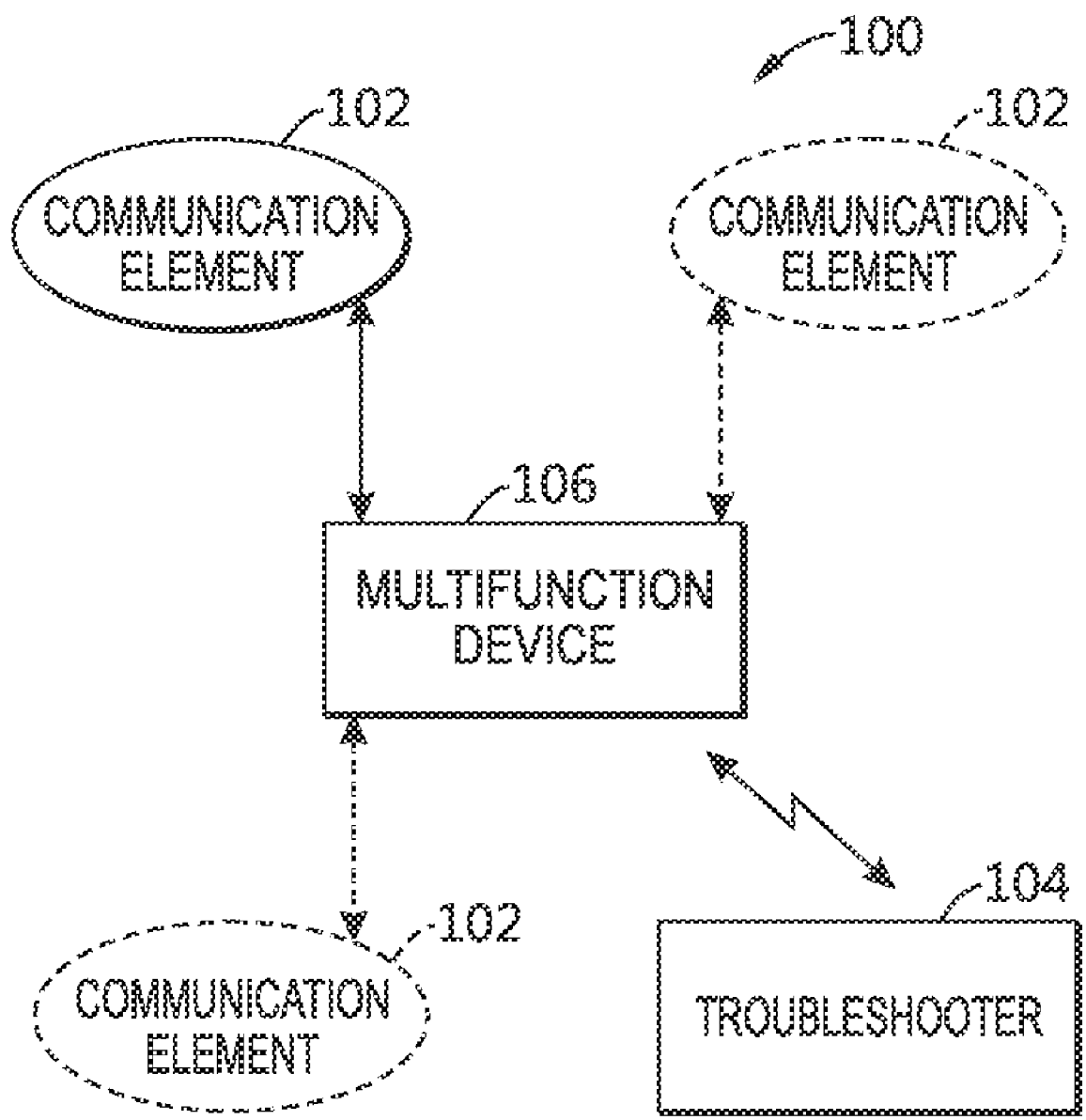
FIG. 1 is a system to facilitate remote troubleshooting of a multifunction device, in accordance with an exemplary embodiment.

FIG. 1 illustrates a system 100 that includes a communication element 102 utilized to facilitate communication to a troubleshooter 104 via a multifunction device 106. The communication element 102 can be utilized proximate to the multifunction device 106 during a troubleshooting session. The communication element 102 can be worn by a user (e.g., a headset, microphone, etc.) such that the user can communicate with the troubleshooter 104 while simultaneously observing the multifunction device 106. Substantially any standard or protocol can be employed for the transfer of audio data from the communication element 102 to the troubleshooter 104.

In one embodiment, the multifunction device 106 provides a communication link as set forth in U.S. Patent Application Publication 2006/0197973 incorporated in its entirety by reference herein. In such an embodiment, a user can pick up the communication element 102 and initiate conversation with the remote troubleshooter 104. The initiation of this communication can be facilitated via a push-button, an audio signal, etc. to notify the troubleshooter 104 of the user's desire to communicate.

In one embodiment, communication is facilitated via a voice over IP (VoIP) connection. It is to be appreciated, however, that the communication element 102 can interface with the multifunction device 106 via substantially any protocol such as wireless Ethernet, Bluetooth, etc. as known in the art. In one embodiment the communication element 102 is a headset that is worn by the user on their head. A band can extend across a user's head to hold the communication element 102 in place. The communication element 102 can further include a microphone which extends laterally across the user's mouth.

The multifunction device 106 can be substantially any device that facilitates performance of at least one of a copy, a facsimile, a print and an email communication. The multifunction device can utilize known wired and/or wireless protocols to facilitate communication of data from the multifunction device to one or more recipients and/or to facilitate communication between the communication element 102 and the troubleshooter 104.

The multifunction device 106 can include a position control device that tracks the location of the communication element 102 relative to the multifunction device 106. As shown in the system 100, the communication element 102 can be located in substantially any location proximate to the multifunction device 106. One limitation of proximity could be the wireless protocol utilized to facilitate communication. It is to be appreciated, however, that a user will remain within a radius proximate to the multifunction device in order to execute troubleshooting methodologies that address performance related issues. It can be further assumed that the user is facing the multifunction device 106 when performing such troubleshooting tasks. Accordingly, by association the communication element 102 can have a presumptive direction of rotation relative to the multifunction device 106. This assumption can be further utilized in data processing to identify particular location of the communication element 102 (and therefore the user) relative to the multifunction device 106.

The troubleshooter 104 can be located remotely relative to the multifunction device 106. In one embodiment, the troubleshooter 104 interfaces to a knowledge base that contains a plurality of known solutions to address a number of disparate performance issues. The knowledge base can be organized and indexed for quick retrieval by the troubleshooter 104 in order to offer appropriate direction to a user. The troubleshooter 104 can communicate with the user via the communication element 102 through the multifunction device 106. In addition, the troubleshooter 104 can receive location information from the communication element 102 via the multifunction device 106. In this manner, the troubleshooter 104 has access to a knowledge base, user location relative to the multifunction device 106, and audio communication with the user via the communication element 102. Having these datasets can allow a troubleshooter to provide a contextualized direction to the user in order to facilitate efficient solutions to various performance issues.

Figure 2:
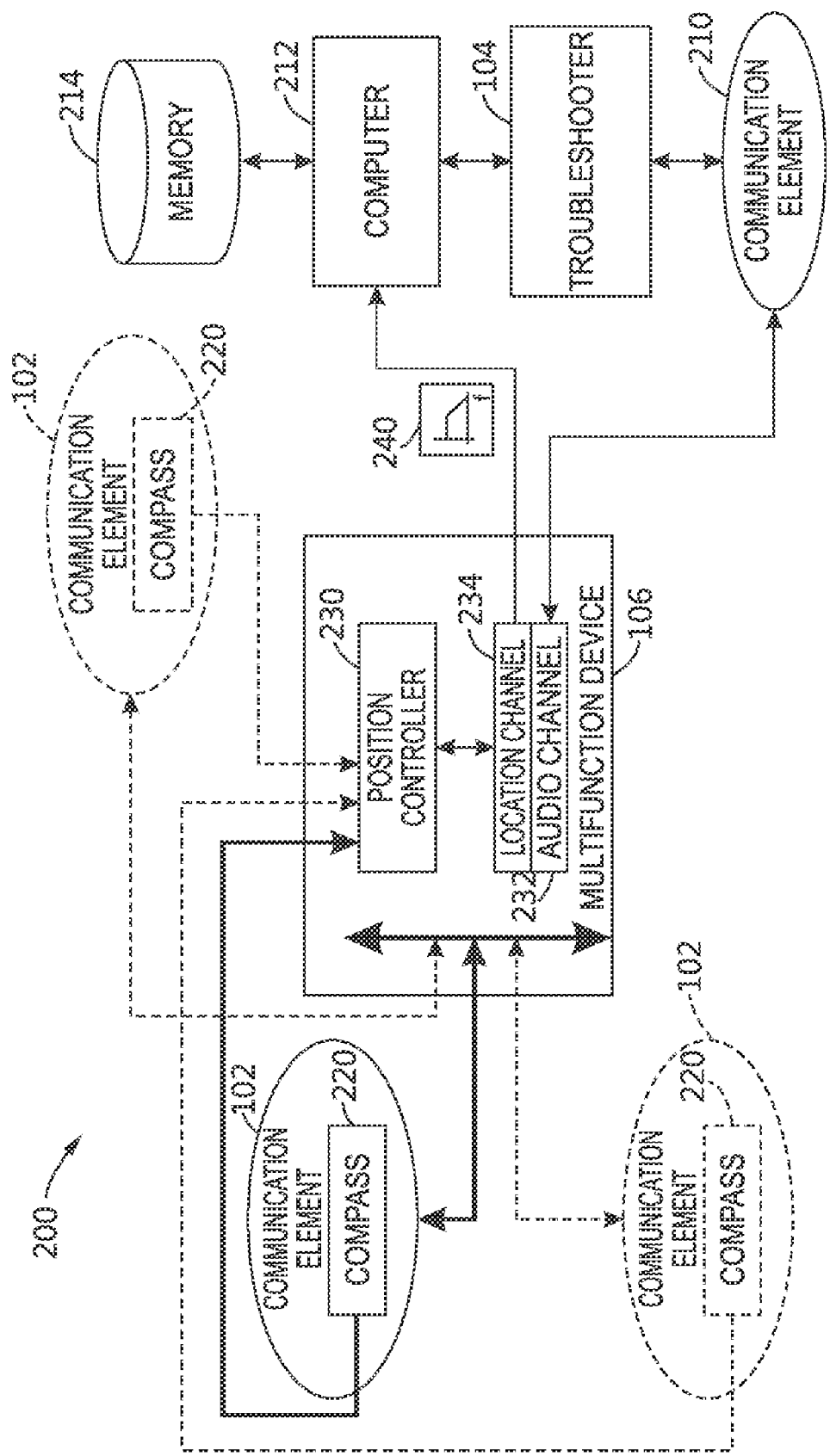
FIG. 2 is a system to facilitate real time troubleshooting of a multifunction device, in accordance with an exemplary embodiment.

FIG. 2 illustrates a system 200 that facilitates efficient a addressing of a performance issue related to a multifunction device 106. The system 200 includes a communication element 102 that interfaces to a multifunction device 106 as set forth in the system 100 above. Further, the system 200 includes a troubleshooter that communicates with the communication element 102 via the multifunction device 106. As shown, the communication element 102 can be in substantially any location proximate to the multifunction device 106.

The communication element 102 can further include a compass 220 that provides real time location data to the multifunction device 106. In one example, the compass 220 is initialized at a predetermined data point relative to the multifunction device 106 in order to establish a point of reference for movement therefrom. Such movement can be the angle the compass is located relative to the datum point. In this manner, the compass (and the user) location can be tracked. This location can follow the assumption that the user is always facing the multifunction device 106. It can be further assumed that the multifunction device 106 has a rectangular shape with known dimensions. Therefore, the angle of the compass 220 relative to the datum point can relate to a specific location in space.

The multifunction device 106 can include a position controller 230 utilized to receive location information of the compass 220 relative to the multifunction device 106. The position controller can communicate with the compass 220 via one or more known wireless protocols such as Wi-Fi, Bluetooth, etc. The compass 220 can be located at an inconspicuous location within the communication element 102. In order to initiate location tracking of the compass 220, the communication element 102 can be placed at a predefined location relative to the position controller 230.

Once the datum point has been established, the location of the communication element 102 and the compass 220 can be easily ascertained. It is to be appreciated that the position controller 230 can receive position information from the compass 220 at substantially any frequency. The position controller 230 interfaces with a location channel 234 to provide the location of the compass 220 to a computer 212. The computer 212 can utilize software to process data received from the position controller 230 via the location channel 234. In one example the computer 212 can display the position data to the troubleshooter 104 in a graphical format.

In one embodiment, the computer 212 supports the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 212 can employ an exemplary environment such as a computer that includes a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer 212 can further include a hard disk drive, a magnetic disk drive, e.g., to read from or write to a removable disk, and an optical disk drive, e.g., for reading a CD-ROM disk or to read from or write to other optical media. The input component 102 can include at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the input component 102.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program non-interrupt data. The operating system in the computer 212 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc. A monitor (e.g., the display 116), or other type of display device, is also connected to the system bus via an interface, such as a video adapter (not shown). In addition to the monitor, a computer typically includes other peripheral output devices (not shown), such as speakers, printers etc.

A display can be employed with the input component 102 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the input component 102 via any wireless or hard wire protocol and/or standard.

The computer 212 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

The computer 212 can interface with a memory 214 in order to access data relative to known solutions to given performance issues. In addition, the memory 214 can store a plurality of graphical representations that are each related to various models of the multifunction device 106. In this manner, the troubleshooter 104 can interface with the memory 214 via the computer 212 to present a particular multifunction device graphic at the same time the troubleshooter 104 is communicating with the user via the communication element 102. In one embodiment the computer 212 can display an overhead schematic of the multifunction device wherein the compass 220 is represented as an icon or Avatar that moves relative to thereto. In addition, a virtual rendering of various aspects of the multifunction device 106 can be presented to the troubleshooter 104 via the computer 212. Such graphical representations can facilitate a higher level of understanding between the user and the troubleshooter 104 to facilitate the diagnosis and implementation of a solution to a given problem.

Audio communication between the user and the troubleshooter 104 is facilitated via an audio channel 232 located within the multifunction device 106. The audio channel 232 receives audio data from the communication element 102 and provides the same to the troubleshooter 104. The communication element 210 can be a headset in one embodiment that is coupled to a base via a known wireless protocol such as Wi-Fi, Bluetooth, etc. In one example, the audio channel 232 facilitates communication of audio data via a voice over IP interface. The voice over IP interface can utilize an internet connection for the transfer of audio data from the communication element 102 to the communication element 210.

In one embodiment, the user proximate to the multifunction device 106 will first call the troubleshooter 104 using a predefined initiation protocol. During initialization of the call, the user can be prompted to where the communication element and the user initial orientation will be computed. Once a connection is established, the user and the troubleshooter 104 can begin conversation. During the session, the communication element 102 can communicate the orientation of the user and the position relative to the multifunction device 106. This position is synchronously recomputed, sent over the network via the location channel 234 and displayed to the troubleshooter 104 via the computer 212 so that he/she can drive the conversation accordingly.

The systems and methods can utilize the assumption that the user faces the multifunction 106 in order to infer the orientation of the user around the multifunction device 106 from the orientation of the communication element 102. Such an assumption is reasonable during a troubleshooting activity (e.g. performing operations, locating parts) where the user focuses on the multifunction device 106. However, some changes in communication element 102 orientation can occur because of user head shaking. In such cases a filtering element can be employed to ignore or average out such high frequency location data. In one example, the location of the communication element 102 and space can be averaged. In such an instance, a user shaking their head from left to right would average to the center or mean location of the user. A second technique can be to employ a low pass filter such that any high frequency location data transmitted between the multifunction device 106 and the computer 212 is removed before the location data is received by the computer 212.

Figure 3:
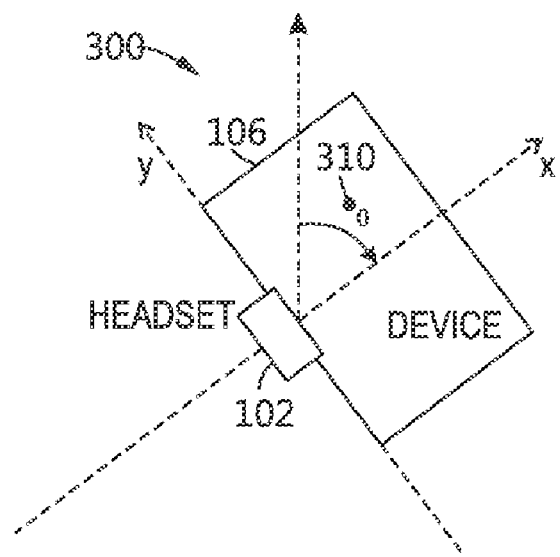
FIG. 3 illustrates calibration of a headset relative to a multifunction device, in accordance with an exemplary embodiment.

FIG. 3 illustrates an initialization session 300 to establish a datum for the communication element 102 relative to the multifunction device 106. In one example, the communication element 102 is hung on a specific slot relative to the multifunction device 106. When the session is initialized and before the headset is removed from the datum location, the position controller 230 can store the initial location 310 returned by the compass 220. This datum point can be utilized as an origin for orientation of the communication element 102 relative to the multifunction device 106. The location of the communication element 102 during the initialization phase 300 can represent an origin in a three dimensional coordinate space (X, Y, Z). It is to be appreciated, however, that the location in a single coordinate plane is all that is necessary to ascertain the location of the compass 220 relative to the multifunction device 106. This one dimension of travel is coupled with the assumption that the user is facing the multifunction device 106 and the multifunction device 106 has a generally rectangular shape.

Figure 4:
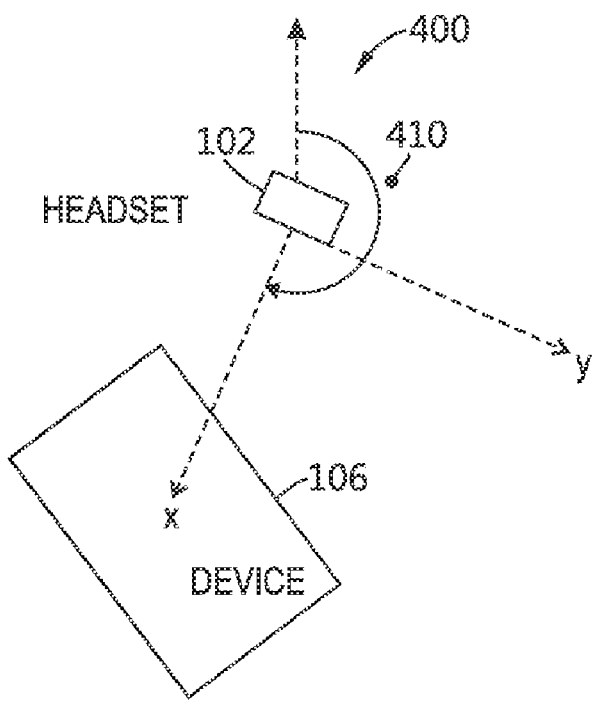
FIG. 4 illustrates identification of location relative to a multifunction device, in accordance with an exemplary embodiment.

FIG. 4 illustrates the communication element 102 during a troubleshooting session. In the real time session 400, the location 410 of the communication element 102 is tracked as an angle relative to the datum point 310 established in the initialization 300. During the session 400, the communication element 102 is worn by the user and the orientation of the user relative to the multifunction device 106 can be deduced from the orientation of the communication element 102 with the assumption that the user is looking at the multifunction device 106. The system can retrieve the location value 410 returned by the compass 220 with the communication element 102 and compute the rotation of the headset around its center from the initial position 310 as location 410 minus datum 310. Assuming that the user always faces the multifunction device 106, the rotation of the communication element 102 around itself is also the rotation of the user around the multifunction device and therefore the user has rotated from the initial position of the location 410 minus the datum 310. This information can then be used to represent the multifunction device and the user's relative location to the multifunction device 106 via the computer 212 for presentation to the troubleshooter 104.

Figure 5:
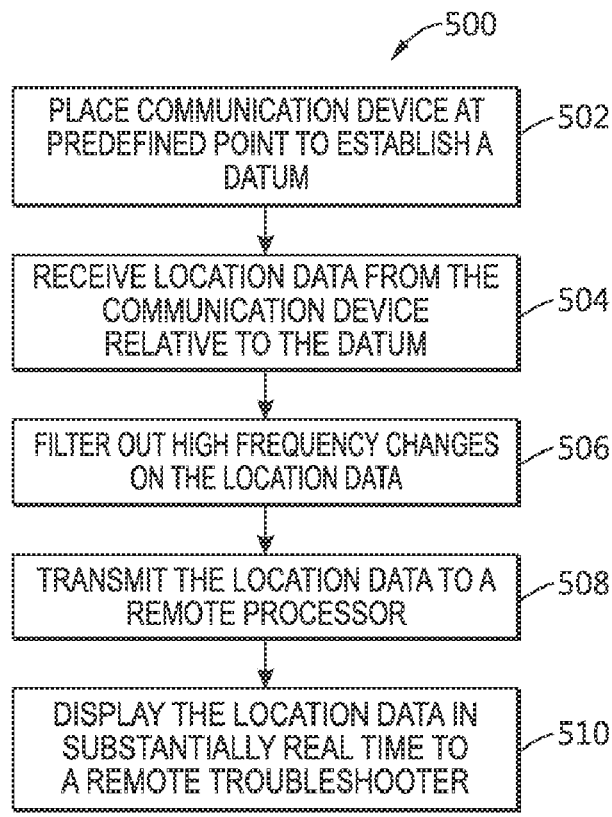
FIG. 5 illustrates a methodology to display a user location to a remote troubleshooter, in accordance with an exemplary embodiment.

FIG. 5 illustrates a methodology 500 to display location data and substantially real time to a remote troubleshooter. At reference numeral 502 a communication device is placed at a predefined point to establish a datum relative to a multifunction device. Once the communication device is placed at the predefined point an initialization action (such as signal initiation, etc.) can notify the multifunction device that a datum is being established. Once the datum is established, location data from the communication device that is relative to the datum can be received at 504. The location data can be communicated via substantially any protocol and/or standard to provide data at a predefined interval. The location data can be communicated based on an event, a predefined interval, and/or continuously.

At 506, high frequency changes in the location data can be filtered. In one approach filtering of high frequency data can be accomplished a low pass filter. Alternatively or in addition, the high frequency can be averaged over a predetermined time interval to provide a more accurate depiction of location data. At 508 the location data is transmitted to a remote processor. At 510 the location data is displayed in substantially real time to a remote troubleshooter via the processor. In one example, the location data is displayed to the troubleshooter as an icon that is animated and proximate to a schematic of a device. In this manner a remote troubleshooter can identify the location of a user during a troubleshooting session in order to provide more meaningful guidance that is contextualized.

Figure 6:
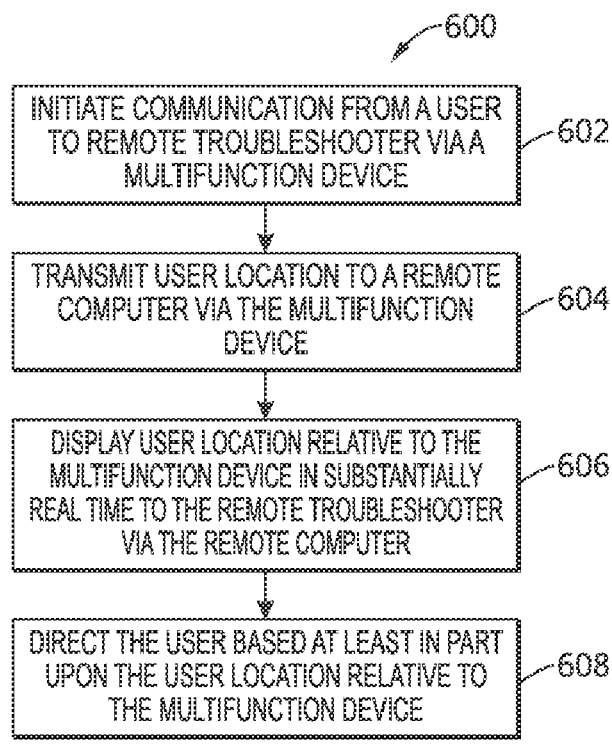
FIG. 6 illustrates a methodology to direct a user based at least in part upon their location relative to a multifunction device, in accordance with an exemplary embodiment.

FIG. 6 illustrates a methodology 600 to direct a user based at least in part upon the user's location relative to a multifunction device. At 602 communication from a user to a remote troubleshooter is initiated via a multifunction device. In one example communication initialization can occur via a call from the user that is facilitated via a voice over IP link established via the multifunction device. Initialization can further include establishing a datum of the headset worn by the user relative to the multifunction device.

At 604 user location data is transmitted to a remote computer via the multifunction device. The location data can be displayed relative to the multifunction device at 606 and substantially real time to the remote troubleshooter. In one example the user location data is displayed as an animated icon that moves relative to a graphic representation of the multifunction device. At 608 the user is directed based at least in part upon the user location relative to the multifunction device. In this manner, a remote party can textualize instructions to the user to address one or more performance issues.

It will be appreciated that various of the above-disclosed and other features and functions, or alternatives thereof, may be desirably combined into many other different systems or applications. Also that various presently unforeseen or unanticipated alternatives, modifications, variations or improvements therein may be substantially made by those skilled in the art which are also intended to be encompassed by the following claims.

What is claimed is:

1. In a remote troubleshooting environment, a system for communicating between a remote troubleshooter, that is remote from a device that provides at least one function, and a user, that is proximate to the device, said system comprising:
- a communication element, adapted to be worn by the user, that facilitates audio communication between the user and the remote troubleshooter, the communication element being located proximate to the device, and providing location data to the device, wherein the communication element is placed in an initialization location proximate to the device to establish a datum point utilized as an origin for orientation of the communication element relative to the device such that movement of the communication element relative to the datum point is recognized as a location of the user proximate to the device; and
- a remote computer accessible to the remote troubleshooter that displays the location of the communication element relative to the device based on the location data;
- wherein the communication element relays servicing instructions to the user from the remote troubleshooter for performing on a component of the device based on the location data.

2. The system according to claim 1, further including a coordinate system utilized to ascertain the location of the communication element relative to the device, wherein the system is a polar coordinate system.

3. The system according to claim 1, wherein the location of the user wearing the communication element is displayed on an interface of the remote computer via an icon that moves relative to a graphic representation of the device.

4. The system according to claim 3, wherein a schematic is displayed for the device.

5. The system according to claim 4, wherein the device is a multifunction device that performs at least one of a copy, a facsimile, a print, and an email.

6. The system according to claim 1, wherein high frequency movement of the communication element is ignored by the remote computer and is not displayed on the remote computer, and wherein filtering is accomplished via a low pass filter that ignores high frequency location data.

7. The system according to claim 1, wherein the remote computer is facilitated via the device.

8. The system according to claim 1, wherein the location of the communication element relative to the device is communicated to the remote computer via the device along with audio data.

9. The system according to claim 1, wherein the remote computer is adapted to interface with the remote troubleshooter for relaying one or more solutions to the user utilizing the communication element proximate to the device.

10. The system according to claim 1, wherein audio data provided by the user is relayed to the remote device via Voice-over-Internet protocol.

11. The system according to claim 1, wherein the device is a multifunction device that performs at least one of a copy, a facsimile, a print, and an email.

12. The system according to claim 1, wherein the remote computer displays one or more troubleshooting components that are particular to the device.

13. The system according to claim 1, wherein the location of the communication element relative to the device is determined based on an angle of rotation that the communication element is from the datum point.

14. The system according to claim 1, wherein the communication element comprises a headset.

15. A method for communicating between a remote troubleshooter, that is remote from a device that provides at least one function, and a user, that is proximate to the device, said method comprising:
- detecting at the device a communication element, adapted to be worn by the user, at an initialization point to establish a datum;
- receiving location data from the communication element, the location data corresponding to a position of the communication element relative to the device based on the datum;
- transmitting the location data from the communication element to a remote computer for display to the remote troubleshooter; and
- relaying at the device to the communication element servicing instructions for the user provided by the remote troubleshooter for servicing a component of the device based on the location data.

16. The method according to claim 15, further comprising displaying the location of the communication element on an interface of the remote computer via an icon that moves as a representation relative to the device.

17. The method according to claim 15, further comprising filtering out high frequency changes in the location data using a filtering element.

18. The method according to claim 17, wherein the filtering includes ignoring high frequency movement of the communication element by the remote computer and not displaying the high frequency movement on the remote computer.

19. The method according to claim 15, wherein the transmitting includes communicating the location of the communication element relative to the device via the device along with audio data.

20. The method according to claim 15, further comprising displaying by the remote computer one or more troubleshooting components that are particular to the device.

21. The method according to claim 15, further comprising determining the location of the communication element relative to the device based on an angle of rotation that the communication element is from the datum point.

* * * * *